United States Patent [19]
Smith

[11] Patent Number: 5,819,244
[45] Date of Patent: Oct. 6, 1998

[54] ADAPTIVE COMPUTING SYSTEMS, COMPUTER READABLE MEMORIES AND PROCESSES EMPLOYING HYPERLINEAR CHROMOSOMES

[75] Inventor: Brian L. Smith, Sunnyvale, Calif.

[73] Assignee: Apple Computer, Inc., Cupertino, Calif.

[21] Appl. No.: 538,508

[22] Filed: Oct. 2, 1995

[51] Int. Cl.$^6$ ..................................................... G06F 15/18
[52] U.S. Cl. ................................ 706/13; 706/10; 706/14
[58] Field of Search ............................ 395/13; 706/13, 706/12, 14, 10

[56] References Cited

U.S. PATENT DOCUMENTS

| | | | |
|---|---|---|---|
| 4,697,242 | 9/1987 | Holland et al. | 395/13 |
| 4,935,877 | 6/1990 | Koza | 395/13 |
| 5,136,686 | 8/1992 | Koza | 395/13 |
| 5,148,513 | 9/1992 | Koza et al. | 395/13 |
| 5,249,259 | 9/1993 | Harvey | 395/13 |
| 5,400,436 | 3/1995 | Nara et al. | 395/13 |
| 5,557,533 | 9/1996 | Koford et al. | 364/491 |
| 5,636,125 | 6/1997 | Rostoker et al. | 364/468.28 |

OTHER PUBLICATIONS

Goldberg, *Genetic Algorithms*, pp. 10–14, 19–20, 80–82, 119, 125–139 (Addison Wesley 1989).

Grefenstette, John J., User's Guide to GENESIS, Version 5.0 (1990).

Birge, R.R. "Protein–Based Computers" *Scientific American*, pp. 90–95, Mar. 1995.

Srinivas, M. et al. "Genetic Algorithms: A Survey", Computer, vol. 27, No. 6, pp. 17–26, Jun. 1994.

Birge, Robert E. "Protein–Based Computers" Scientific American, pp. 90–95, Mar. 1995.

Srinivas, M. et al. "Genetic Algorithms: A Survey," Computer, vol. 27, No. 6, pp. 17–26, Jun. 1994.

Birge, Robert E. "Protein–Based Computers," Scientific American, pp. 90–95, Mar. 1995.

*Primary Examiner*—Allen R. MacDonald
*Assistant Examiner*—Jason W. Rhodes
*Attorney, Agent, or Firm*—Burns, Doane, Swecker & Mathis, L.L.P.

[57] ABSTRACT

Hyperlinear chromosomes are arrays of parameters stored in a computer readable memory, for use in implementing a genetic algorithm. Each chromosome may represent the mapping of a problem, including physical parameters, onto constituent genes which are addressed in memory as multiple, intersecting vectors in n-dimensions, where n is >2. A computing system is adapted to perform hyperlinear crossover, reproduction and fitness evaluation on the hyperlinear chromosomes. An adaptive computing system produces optimized control signals based on the attainment of a desired level of fitness of one or more hyperlinear chromosomes.

20 Claims, 9 Drawing Sheets

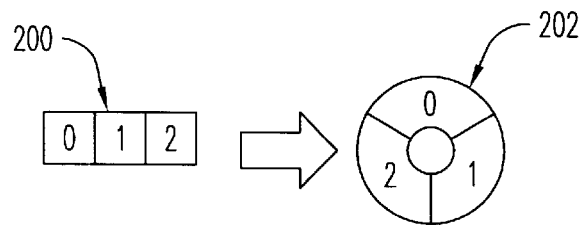
FIG. 14
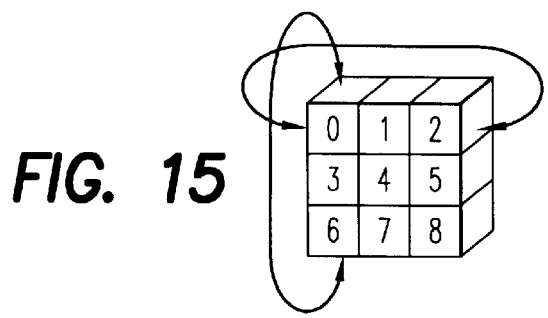
FIG. 15
FIG. 16
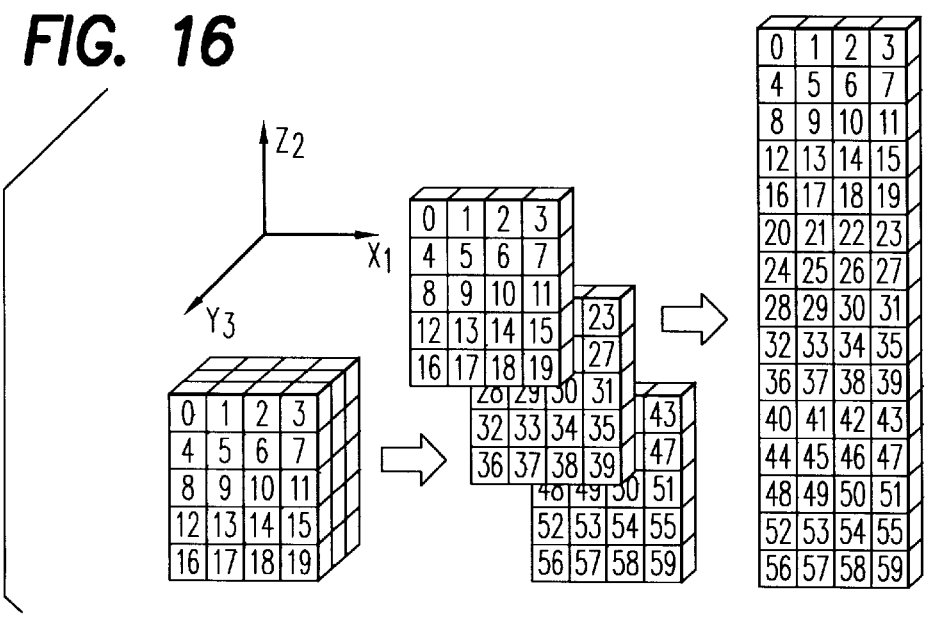

ADAPTIVE COMPUTING SYSTEMS, COMPUTER READABLE MEMORIES AND PROCESSES EMPLOYING HYPERLINEAR CHROMOSOMES

BACKGROUND

Computer software and systems designers have, for some time, attempted to employ computer-based techniques which mimic genetic structures and natural selection in an attempt to produce adaptive or self-teaching systems for solving physical problems. The problems include such things as optimization of pipeline systems, medical image registration, etc. Goldberg, *Genetic Algorithms*, pp. 125–139 (Addison-Wesley Publishing Co. 1989) (hereafter referred to as "Goldberg").

In the prior art, linear chromosomes (single dimensional strings of problem parameters or genes) have been employed. Generation by generation, new populations of these chromosomes are created from pieces of the fittest members of preceding generations. Most basic genetic algorithms employ three operators: reproduction, crossover and mutation. Goldberg at pp. 10–14. These operators act sequentially on the chromosome populations, whose fitness is periodically evaluated. Reproductive success is determined at least in part by the fitness of population members, as is the case with analogous biological populations. Fit chromosomes from evolved populations produce problem solutions. An example of computer software for implementing genetic algorithms is John Grefenstette's GENESIS program, version 5.0 (1990). Portions of this program were used to perform the experiments discussed below.

The preliminary step of any genetic algorithm (GA) is specifying an appropriate encoding or mapping of problem-related variables onto the chromosome string. This mapping is important because it determines the defining length of the schemata encompassing related alleles (gene values). "Highly fit, short-defining-length schemata (we call them building blocks) are propagated generation to generation by giving exponentially increasing samples to the observed best." Goldberg at pp. 19–20. Occasionally, the optimal encoding is obvious, but typically it requires intimate knowledge of the relationships among the encoded variables. Even when these dependencies are well understood, coding design for meaningful building blocks is something of an art. See Goldberg at pp. 80–82.

As the distance between the loci (positions on the chromosome) of two related genes increases, the linkage between these variables weakens. Although this effect can be evident in problems with as few as three interrelated variables, it becomes especially pronounced in problems with a large number of controlling variables. Even when all associated genes are closely grouped, the sheer number of correlated factors limits the minimum distance between genes on the periphery of the grouping. Further, the placement of genes within this grouping implicitly prejudices the search of the solution space. Schemata comprising the alleles of adjacent genes are minimized in length and are very likely to survive crossover operations. Conversely, schemata comprising the alleles of the genes on the periphery of the grouping can be significantly longer and correspondingly less likely to survive crossover operations. Thierens and Goldberg state, ". . . it is still not possible given a problem of known or estimated difficulty to set up a simple GA and expect it to solve that problem quickly and reliably." (Thierens and Goldberg, "Mixing in Genetic Algorithms", Proceedings of the Fifth International Conference On Genetic Algorithms, Morgan Kaufman Publishers, San Mateo, Calif. (1993).

This problem is further compounded when the relative importance and interaction of encoded variables is not fully understood. At this point gene placement becomes almost arbitrary, and scientists resort to inversion, reordering, or mixing operations in an attempt to derive an effective sequencing of the genes. "Inversion is the conventional answer when genetic algorithmists are asked how they intend to find good string orderings, but inversion has never done much in empirical studies to date" (Goldberg and Lingle, "Alleles, Loci and the Traveling Salesman Problem", Proceedings of an International Conference on Genetic Algorithms and Their Applications; pp. 154–159 (1985). While reordering techniques have advanced significantly since 1985, these operations have still not overcome the difficulties associated with genetic algorithms. It is an object of this invention to overcome the foregoing difficulties. These and other objects and features of the present invention will be made apparent in the following summary and descriptions.

SUMMARY OF DISCLOSURE

The present invention relates to adaptive computing systems, computer readable memories and processes employing genetic algorithms in which the chromosomes are hyperlinear (n-dimensional with $n \geq 2$).

More specifically, there is disclosed a computer readable memory which contains data representing a population of hyperlinear program chromosomes in which each hyperlinear program chromosome represents the mapping of physical problem parameters onto program genes which are addressed in memory as multiple, intersecting vectors in n dimensions, where n is $\geq 2$. A physical problem may be represented by a sequence of simultaneous equations, and vectors corresponding to each equation are arranged to form low-order schemata relevant to the computation. Genes on the extremities of a dimension are addressed as being adjacent to one another to form a toroidal or hyperloop configuration.

A further embodiment of the invention is an adaptive computing system for providing control output signals responsive to sensed, environmental conditions where the environment is modeled by a plurality of simultaneous equations. The equations share at least some parameters. A computer readable memory stores hyperlinear chromosome populations into which the terms of each of the simultaneous equations are mapped as sequential genes. A parallel processing means may be provided for simultaneously evaluating the fitness of members of the hyperlinear chromosome populations. New hyperlinear chromosomes are repetitively generated responsive to the evaluated fitness of the chromosomes. Hyperlinear crossover is employed to produce members of succeeding generations of hyperlinear chromosomes. Hyperlinear chromosomes are selected on the basis of their fitness to generate output control signals responsive to current sensed parameters in the environment.

In a preferred embodiment of the adaptive computing system, the hyperlinear chromosomes are N-dimensional. Hyperlinear crossover is performed on such chromosomes by first randomly selecting one of the N dimensions. The chromosome is then divided into parallel substrings lying along the selected dimension. A crossover point is selected at random within one of the substrings. The chromosome is then cleaved at the selected crossover point. At least one new chromosome is then created by combining portions of the divided chromosomes. The new chromosome is evaluated for fitness. Reproduction occurs in accordance with a probabilistic function of fitness. The crossover point may be selected to coincide with a gene boundary or to lie within a bit string corresponding to a single gene.

This summary is provided as an aid to understanding the disclosure. The specific definition of the invention is set forth in the claims of this patent.

BRIEF DESCRIPTION OF THE DRAWINGS

FIG. 14 is a schematic depiction of the configuration of a linear chromosome into a loop in accordance with the teachings of the prior art.

FIG. 15 is a schematic depiction of linkages among several genes of a planar chromosome when opposing edges are connected to form a toroid.

FIG. 16 is a schematic depiction of a mapping of a 3×4×5 chromosome.

DETAILED DESCRIPTION

The present disclosure relates to hyperlinear chromosomes and adaptive computing systems, and computer-readable memories structures to implement and use hyperlinear chromosomes. The disclosure also relates to procedures for the creating of, the storing of and the performing of crossovers on hyperlinear chromosomes.

Hyperlinear chromosomes can be represented as multidimensional geometric structures, which allow close coupling of arbitrarily large numbers of related variables. A gene on a linear chromosome is grouped with at most two adjacent genes. By increasing the dimensional structure of the chromosome (e.g. from linear to planar, cubic, etc . . . ), additional genes can be closely linked without increasing the defining length of their schema.

Hyperlinear Chromosomes

Figure 1A:
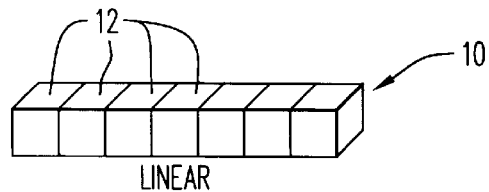
FIG. 1a is a schematic depiction of a prior art linear chromosome.

Natural evolution is constrained by the mechanics of performing physical crossovers in three dimensional space. Accordingly, biological chromosomes have evolved with relatively unsophisticated gene to gene relationships. For example, in a linear chromosome, a gene has at most two adjacent neighbors. This relationship is shown schematically in FIG. 1a where a linear chromosome 10 is depicted as a series of parameters or genes 12. However, a computer implemented planar (two dimensional) chromosome, as taught in this disclosure, provides organizations with two, three, or four adjacent neighbors. See FIG. 1b. This organization can halve the distance between related genes. This organization would significantly complicate the procedure necessary to biologically realize a planar crossover. Similarly, a three dimensional chromosome (FIG. 1b) provides three, four, five, or six adjacent neighbors to each gene, but the contortions required for the biological representation of a cubic crossover are prohibitively complex.

Figure 1B:
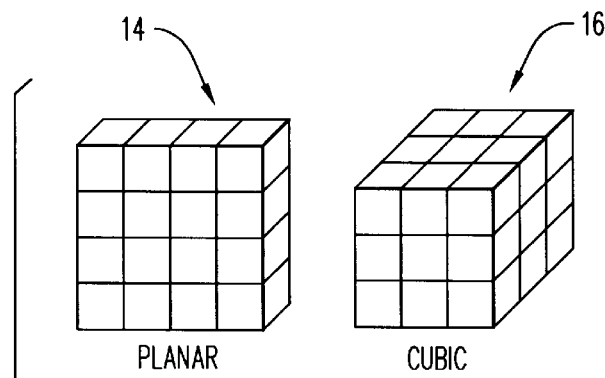
FIG. 1b contains schematic depictions of planar and cubic chromosomes.

Fortunately, the use of genetic algorithms within computers is not limited by these same mechanics of physical representation. Digital chromosomes can be arbitrarily defined by planar, cubic, or higher level dimensional constructs as shown in FIG. 1b. This representation provides an extremely powerful tool for evaluating whole new classes of problems that formerly defied analysis through genetic algorithms. Problem solvers can choose a dimensional representation which provides the most appropriate mapping of related factors. In fact, all associated elements of a problem can be placed in adjacent positions by choosing a structure of sufficient dimensionality. The "art" of carefully assigning the ordering of genes within a chromosome is reduced to a clustering protocol. Since more related genes will be equidistant, implied preferences of one factor over another are minimized, and foreknowledge of the relative importance of any factor over another is less important.

Hyperlinear Chromosome Crossovers

Hyperlinear chromosomes provide a much greater range of definition for a crossover operation. Chromosomes can be "cleaved" along a common plane, or "torn" across the set of dimensions. They can be divided into a matrix of substrings (i.e. small, dimensionally oriented chromosomes fragments 18 shown in FIG. 2), or woven into a mono-dimensional chromosome (the sequence of substrings along a particular dimension). Further, virtually all of the optimization techniques currently used in linear crossover have an equivalent transform within a hyperlinear space.

Hyperlinear chromosomes do have three additional constraints not shared by linear representations. First, to simplify mapping, stacking, and alignment operations, it is preferable for all genes to share a common length. Component genes of a linear chromosome can assume arbitrary lengths, since alignment is along the zero dimensional endpoints of each gene. Hyperlinear chromosomes, by their inherently higher associativity, should align across multiple dimensions along a finite gene length. While for many problems, this common granularity is not a complication, it does provide another insight into why hyperlinear chromosomes have not evolved in nature (where proteins and amino acids can vary widely in length).

Figure 3:
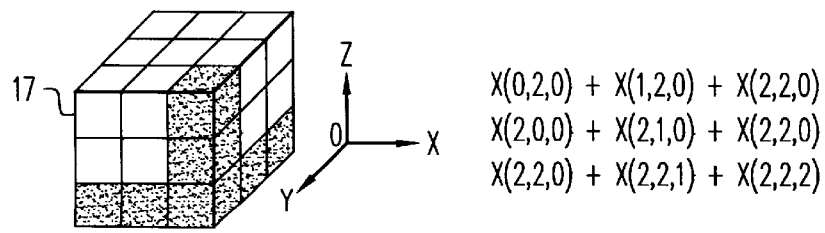
FIG. 3 illustrates the mapping of three equations into the genetic space of a 3×3×3 cubic matrix.

Second, an equation with a large number of terms can require definition over chromosome structures with a high order of dimensionality. These equations may only sparsely populate the genetic space allocated within the chromosome. As shown in FIG. 3, the genetic space of the 3×3×3 cubic matrix 17 is sparsely populated by the three chromosome defining equations presented in the Figure. Only 7 of the 27 available matrix sites are used.

Third, hyperlinear crossovers are inherently more complex than linear crossovers and may require additional computer time to execute. Fortunately, the crossover operation is typically a fraction of the total run time and is usually dwarfed by the fitness analysis phase. Efficient crossover design can minimize this procedural overhead.

Overview of a Process Employing N-Dimensional Chromosomes

Figure 4:
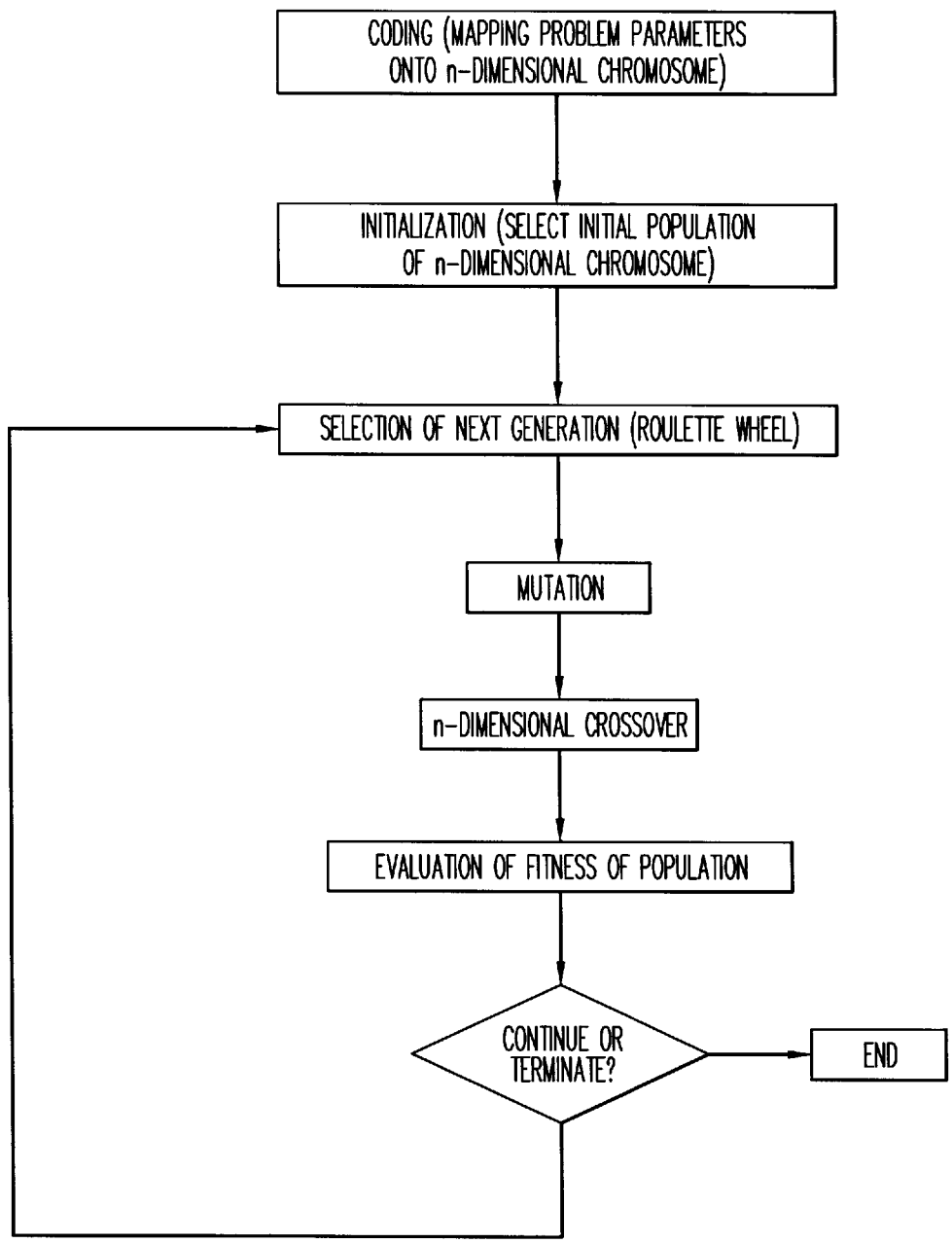
FIG. 4 is a flow diagram illustrating a process for using n-dimensional chromosomes.

A process of using n-dimensional chromosomes is depicted schematically in the flow diagram of FIG. 4. In the first step problem parameters are mapped onto an n-dimensional chromosome. In the Example discussed below, the problem is represented by a sequence of nine simultaneous equations, mapped onto 21 elements of a 3×3×3 (cubic) chromosome.

In an initialization step, initial values are selected for the parameters defining each string. These values may be selected at random.

The chromosomes population undergoes reproduction (selection of the next generation). In reproduction chromosome are copied according to their fitness values, chromosomes with higher fitness values having a higher probability of contributing offsprings to the next generation. This may be performed as in linear chromosome reproduction by use of a weighted roulette wheel: i.e. a roulette wheel with slots sized according to fitness. See Goldberg at p. 11.

A low level of random or essentially random variation may be introduced into the population by the process of mutation, of a type employed in conventional systems involving linear chromosomes.

Figure 5:
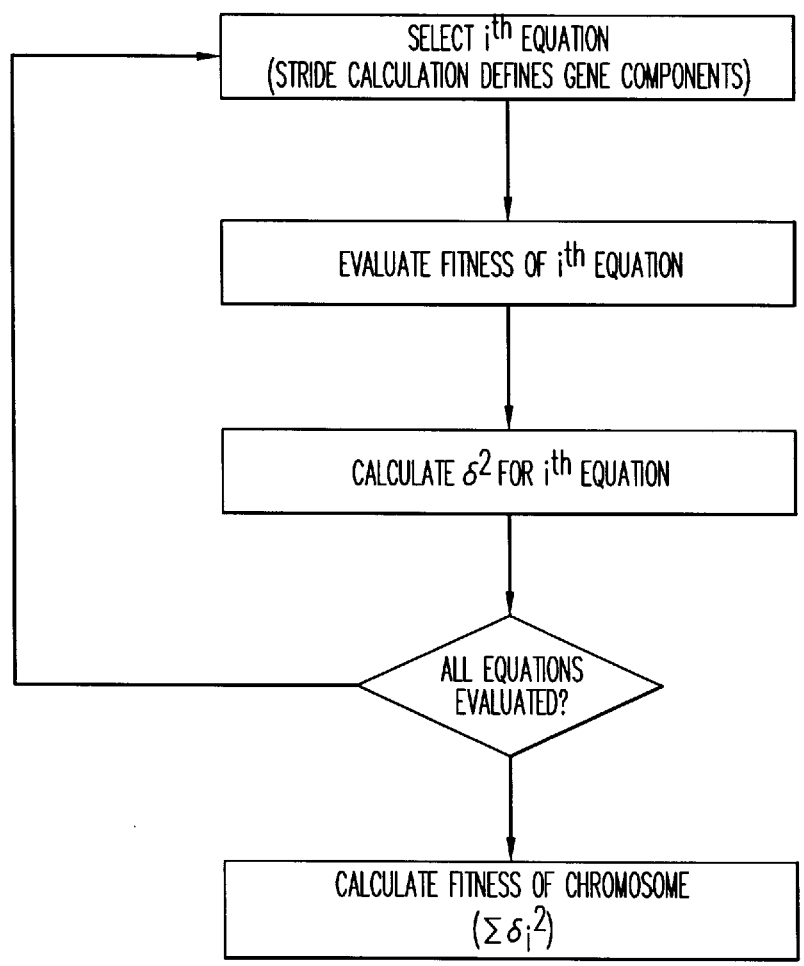
FIG. 5 is a flow diagram illustrating an example of a fitness evaluation subroutine.

N-dimensional crossover is performed on some or all of the members of the population, as described more fully below. The fitness of the population is evaluated, and the process repeated as necessary to produce succeeding generations. A subroutine for evaluation of the chromosome population is illustrated in FIG. 5. In this subroutine, each equation mapped in the n-dimensional chromosome is extracted and evaluated. The result is compared to the known or measured value for each equation to obtain a value of $\delta$ for each equation. The $\delta$ values are squared and summed to provide an indication of the overall fitness of each chromosome in the population.

Implementation of Cubic Crossover Operations

Figure 6:
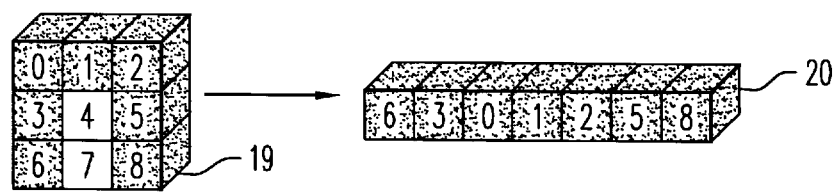
FIG. 6 illustrates the unfolding of a linear chromosome from genetic space of a 3×3 planar matrix.

Simple planar chromosomes can often be approximated by equation folding and careful gene placement in a linear chromosome. This is illustrated in FIG. 6 where coefficients 0, 1, 2, 3, 5, 6 and 8 mapped onto a planar matrix 19, are unfolded to form the linear chromosome 20. The Example presented below uses cubic chromosomes to illustrate the performance advantages of hyperlinear crossover operations. Using the framework provided by John J. Grefenstette's GENEtic Search Implementation System (GENESIS Version 5.0), the original linear crossover algorithm was changed from a two point crossover to a traditional one point crossover. This change was performed to simplify the comparison between the linear and cubic crossover algorithms. The cubic crossover chosen for comparison was a Distributed Substring Recombination (DSR) algorithm. DSR crossovers are distributed throughout the chromosome space without regard for the mapping of the equations within that space. Even though six of the 27 genes of the cubic chromosome (22% of the genetic volume) are not used in the equation mapping (see FIG. 8 and discussion below), no attempt is made to focus the crossovers around the "wasted" space of the cubic chromosome. More sophisticated hyperlinear crossover algorithms would take advantage of this organization (e.g. Focused Substring Recombination).

During each DSR crossover, a cleaving direction is randomly selected from all represented dimensions (X, Y, and Z for a cubic chromosome). This random choice of cleaving direction serves to equalize the optimization of schema among the defined dimensions. Once the dimension is determined, the chromosome is viewed as an array of gene substrings (see FIG. 2). One of the substrings is randomly selected from the first parent for crossover with the corresponding substring of the second parent. This substring crossover is identical to a traditional linear crossover with the exception of the stride calculation (offset in bits between genes of the substring) required to address subsequent genes in a substring. In fact, to simplify visualization, each gene of the parent substrings could have been copied to a "scratch" pair of linear chromosomes. Then these linear chromosomes could perform a traditional one point crossover with the genes of the resulting substrings copied back to the original locations in the cubic chromosome. Note also, that hyperlinear chromosomes do not have to be regular structures. All algorithms easily scale to arbitrary organizations (e.g. a 3×4×5 array) with simple changes to the substring and stride definitions.

Figure 2:
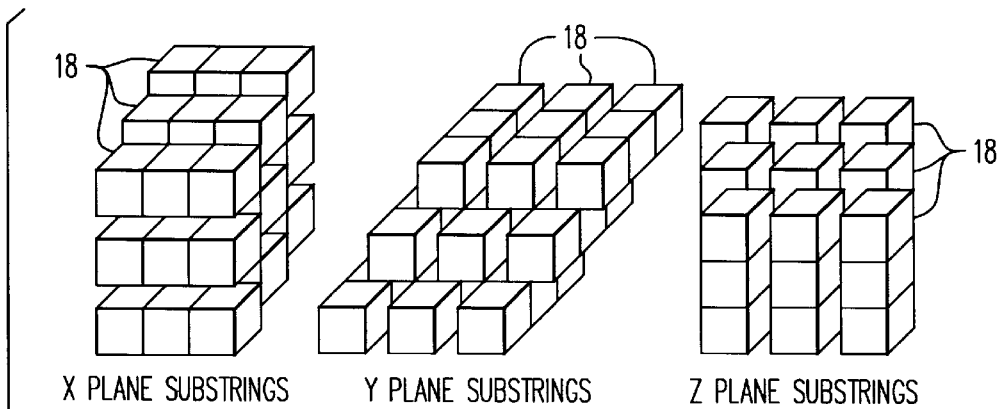
FIG. 2 illustrates the division of a 3×3×3 cubic chromosome into various substrings.
Figure 10:
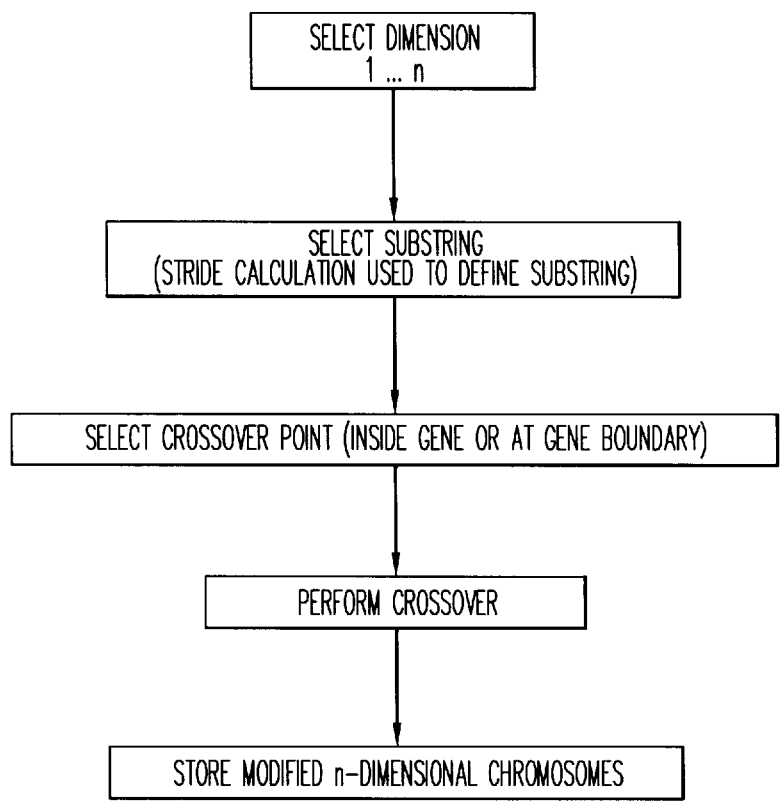
FIG. 10 is a flow diagram illustrating an example of an n-dimensional crossover subroutine.

An example of an n-dimensional crossover subroutine is given in FIG. 10. In the subroutine a dimension is first selected (n=1, 2 or 3 in the case of a cubic chromosome). A particular substring, such as shown in FIG. 2, is selected at random, as well as a crossover point (inside a gene or at a gene boundary). Two parent chromosomes are selected from the current population. The chromosomes are each cleaved at the selected crossover point, and the resulting chromosome fragments are exchanged and recombined to form one or more child chromosomes. The resulting, modified n-dimensional chromosome, may then be stored or evaluated. Crossover is repeated to obtain each successive generation, with the random reselection of a new crossover dimension.

EXAMPLE

In this Example, the performances of a linear chromosome system and a cubic chromosome system are compared. To avoid handicapping the linear chromosome with the equation mapping of the cubic chromosome, gene placements were remapped before performing linear crossovers. During the remapping, equation folding was used to minimize the distance among the related elements for each equation (see example, FIG. 6). In addition the six unused genes were removed from the linear chromosome so that the linear crossover was performed on a 21 gene chromosome (as opposed to the 27 gene chromosome optimized by the cubic crossover). Note that if the equation mapping (see FIG. 7 and FIG. 8) had interlocked the set of equations (interconnected all equations by shared coefficients, e.g. a grid), there would have been no reasonable technique to linearly remap the set of coefficients required to realize one equation without adversely affecting the linkage of another equation's elements.

Problem Definition and Fitness Evaluation

To demonstrate the generality of hyperlinear representations, the fitness function was composed of nine randomly generated linear equations:

X Plane Equations:
X(0,0,0)*S(0)+X(1,0,0)*S(1)+X(2,0,0)*S (2)=Result 0
X(0,1,1)*S(3)+X(1,1,1)*S(4)+X(2,1,1)*S (5)=Result 1
X(0,2,2)*S(6)+X(1,2,2)*S(7)+X(2,2,2)*S (8)=Result 2
Y Plane Equations:
X(0,0,0)*S(9)+X(0,1,0)*S(10)+X(0,2,0)*S (11)=Result 3
X(1,0,1)*S(12)+X(1,1,1)*S(13)+X(1,2,1)*S (14)=Result 4
X(2,0,2)*S(15)+X(2,1,2)*S(16)+X(2,2,2)*S (17)=Result 5
Z Plane Equations:
X(0,0,0)*S(18)+X(0,0,1)*S(19)+X(0,0,2)*S (20)=Result 6
X(1,1,0)*S(21)+X(1,1,1)*S(22)+X(1,1,2)*S (23)=Result 7
X(2,2,0)*S(24)+X(2,2,1)*S(25)+X(2,2,2)*S (26)=Result 8
where X(x,y,z) values refer to matrix coefficients and S(n) values refer to random preselected scalar multipliers.

Figure 7:
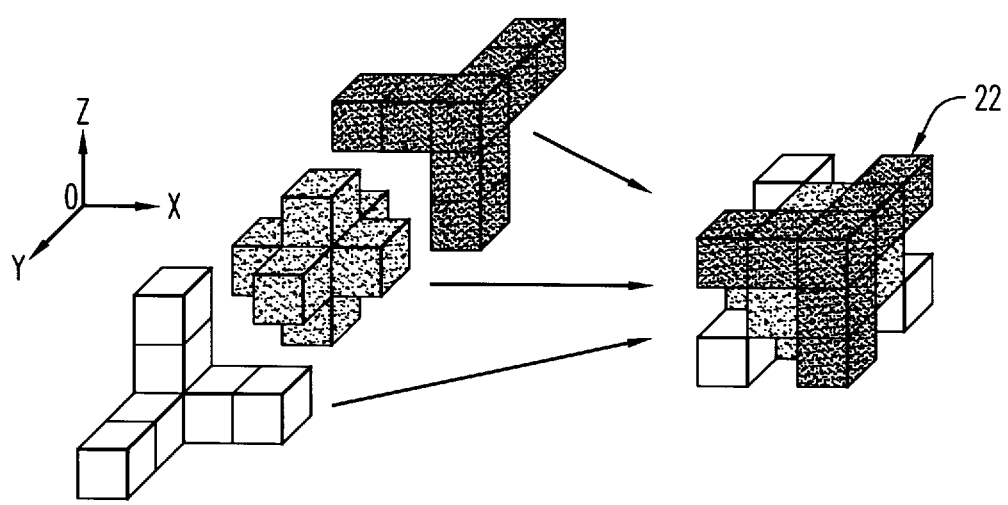
FIG. 7 illustrates the mapping of three separable sets of intersecting equations in the genetic space of a 3×3×3 cubic matrix.
Figure 8:
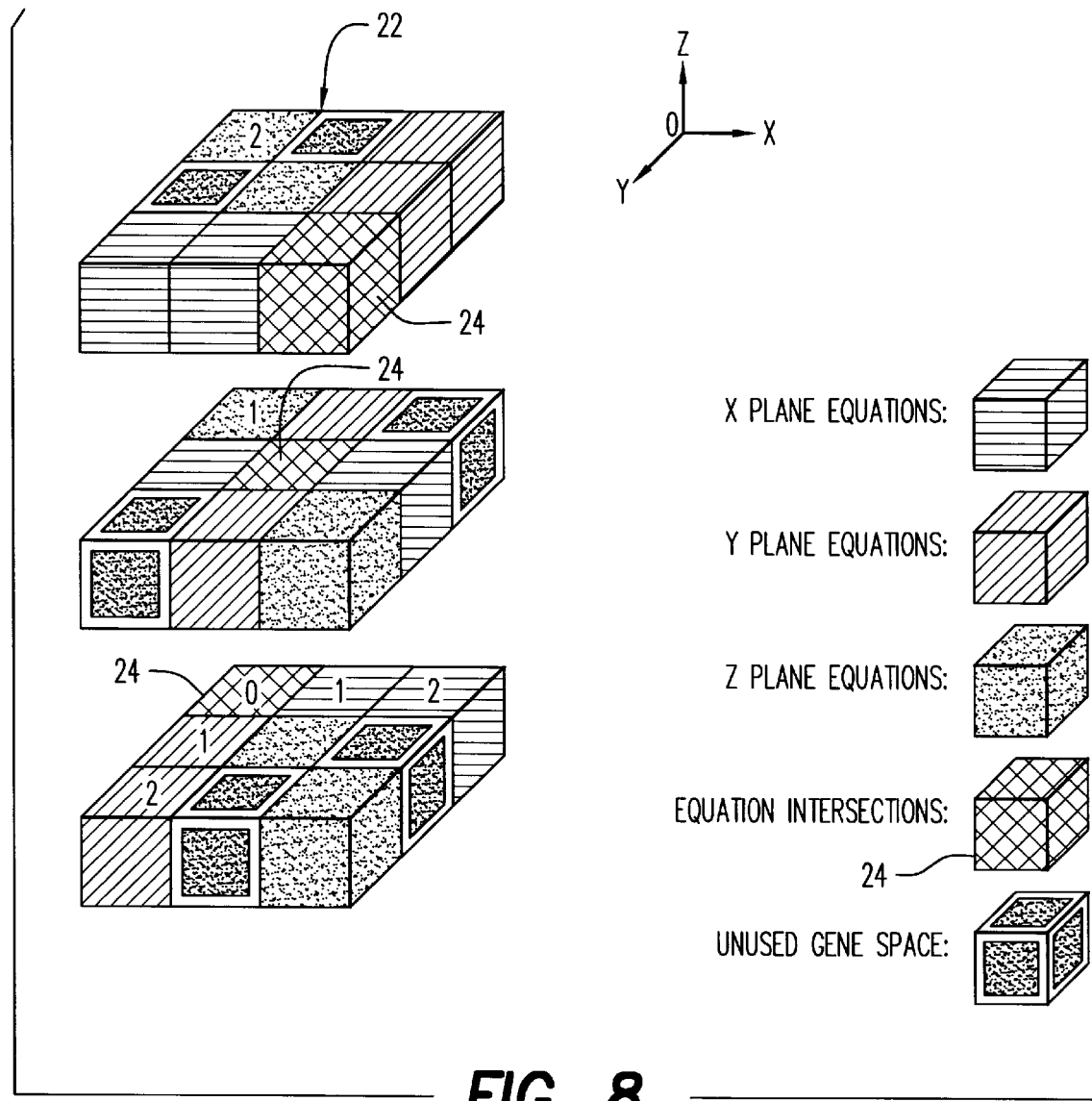
FIG. 8 illustrates the mapping of the equations of the Example onto the genetic space of a 3×3×3 cubic matrix.

As shown in FIGS. 7 and 8, the equations map onto a cubic chromosome 22. In the Example, each of the X equations, intersects with one Y equation and one Z equation, respectively. These intersections are depicted as cross-hatched blocks 24 in FIG. 8. In FIG. 7 the three separable sets of intersecting equations are shown in an exploded view on the lefthand side of the Figure, and in combined, cubic form on the righthand side of the Figure.

Figure 9:
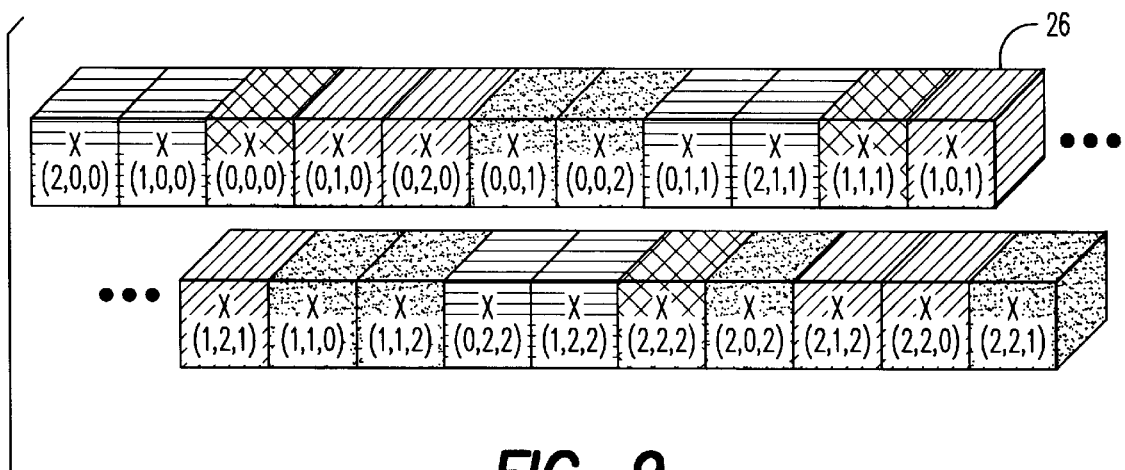
FIG. 9 illustrates, for comparison purposes, the mapping of the equations of the Example onto a linear chromosome.

The base chromosome analyzed in the Example was a 216-bit sequence, composed of 27, 8-bit genes. For the cubic crossover operation, these genes were viewed as a 3×3×3 matrix (see FIG. 8). For the linear crossover operation, these genes were remapped as a single chain 26 of 21 genes as shown in FIG. 9.

At the start of each trial a solution matrix of 27 random coefficients was generated. Nine equations were mapped within this matrix (see equation definitions above) and used as individual fitness cases for comparing matrices of genetically evolved coefficients to the initially specified solution matrix. Each equation was the sum of three random coefficients (between 0 and 255 inclusive) multiplied by three random scalars (between −5 and 5 inclusive). Total fitness was the sum of squared error across the nine equations between the specified and evolved results. Unique arrays of coefficients and scalars were randomly generated for each trial. In fact, the only element of the fitness function that was not randomly generated for each trial was the equation mapping.

Example Results

Each algorithm (linear and cubic DSR) was evaluated in ten separate trials (20 total trials, divided into 10 trial pairs) to provide an array of results for comparison. During a pair of trials, each algorithm started with an identical solution matrix and initial population (both randomly generated for the trial). A trial was composed of an initial population of 5,000 individuals that participated in more than 2,000,000 evaluations over more than 600 generations. A unique random seed was used to generate all random variables for each of the ten trial pairs. These seeds were generated from a rotating sequence of the digits 0–9 (i.e. 1234567890, 2345678901, 3456789012, etc. . . . ). All default values of the GENESIS program were selected except: Floating point representation (disabled), Total Trials (1,000 changed to 2,000,000), Population Size (50 changed to 5,000), and Structures Saved (10 changed to 1,000). Each of the trials was executed on an HP 755 100 MHz PA-RISC workstation and compiled with the generic C libraries and tools provided with the platform.

Due to the high epistasis of the fitness function, no exact solution was achieved within the 2,000,000 evaluation limit set on each trial. This period was selected as a stopping point because improvements in both linear and cubic algorithms had slowed to less than one change for every fifty generations (with even these changes showing only marginal improvements). A summary of the results across the ten trial pairs is provided in Table 1 and displayed in FIG. 11.

TABLE 1

| Trial # | Initial Deviation | Deviation Of Final Generation/ Linear (L) | Deviation Of Final Generation/ Cubic (C) | Ratio L/C |
| --- | --- | --- | --- | --- |
| 1 | 137600 | 626 | 164 | 3.82 |
| 2 | 210978 | 942 | 117 | 8.05 |
| 3 | 226255 | 901 | 157 | 5.74 |
| 4 | 247548 | 1174 | 202 | 5.81 |
| 5 | 100931 | 616 | 62 | 9.94 |
| 6 | 126197 | 965 | 40 | 24.13 |
| 7 | 228958 | 582 | 70 | 8.31 |
| 8 | 91291 | 600 | 47 | 12.77 |
| 9 | 76640 | 234 | 315 | .74 |
| 10 | 267847 | 981 | 264 | 3.72 |
| Average | 171425 | 767.5 | 143.8 | 5.34 |

Figure 11:
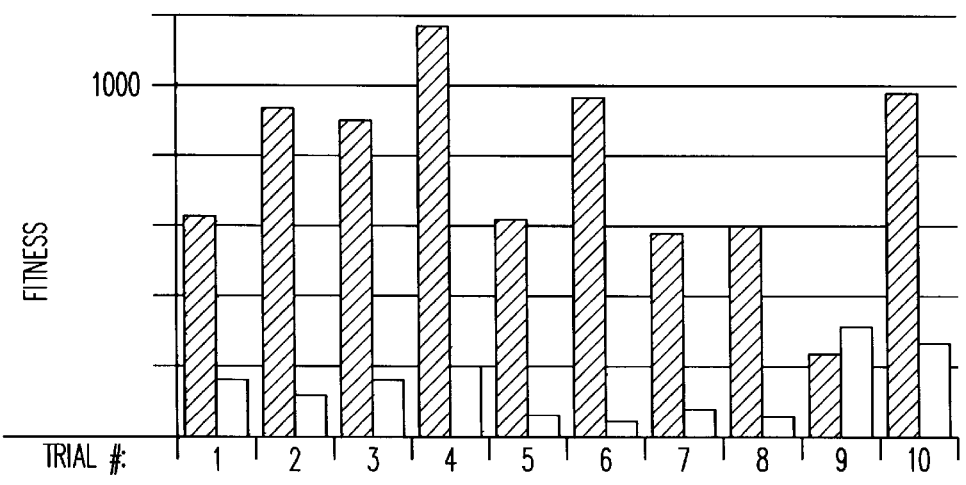
FIG. 11 is a graphic illustration of a comparison of the performances of processes employing the 3-dimensional chromosome of FIG. 8 with the performances of processes employing the linear chromosome of FIG. 9.

FIG. 11 graphically illustrates the substantial improvements demonstrated by the use of cubic crossovers. In FIG. 11 the dark columns represent the deviation for the final generation obtained with conventional linear chromosomes. The light columns represent the deviation for the final generation obtained with cubic chromosomes. With the exception of Trial 9, every cubic crossover demonstrated almost a 4:1 ratio of improvement with respect to traditional linear crossovers. In fact, the average ratio between cubic and linear performance was greater than 5:1 with a peak of more than 24:1. Trial 9 is noteworthy, because it is the only trial where the cubic crossover did not improve over the linear crossover. Further analysis of the particular equations generated in this trial, does not reveal any unusual distribution of coefficients or scalars. However, with the enormous variety generated in the solution space for these trials, it would be almost more surprising if a technique provided an advantage in every one of a significant number of trials. What is more important about Trial 9, is that it demonstrates that even in a case where cubic crossovers do not provide an advantage, they still appear to closely track the best values attained through linear crossover (reaching a 0.74 ratio with respect to the best linear approximation).

An even more interesting conclusion can be reached with respect to the extreme limitations imposed on the cubic crossover analyzed in this Example. Since focused crossovers were not used in this Example, we can expect that 22% (6 of 27 genes) of all genetic material transferred in the cubic crossover was irrelevant to the problem solution. The linear crossovers did not suffer from this disadvantage since the unused genes were removed during the process of mapping the equations to a linear chromosome. Further, the problem examined was extremely susceptible to linearization. All equations were folded during mapping onto the linear chromosome. All genes from both the X and Y plane equations were arranged colinearly without gaps in placement, and two of the three genes for each Z plane equation were mapped to adjacent positions with the third element suffering only a two gene separation (see FIG. 9). In other words, 86% of all problem elements were optimally grouped with the remaining 14% suffering only a two gene dislocation. On any problem of greater complexity or in a problem where the equations had been interlocked within the matrix of coefficients (a more likely scenario for hyperlinear representations), any mapping to a linear chromosome would have shuffled much of the gene linkage, and performance expectations for the linear crossover would have been much more pessimistic. Finally, the problem analyzed in the Example was of very low dimensionality (cubic), and utilized only one of a large number of potential hyperlinear crossover operations. All these factors lead to the conclusion that the comparative advantage of hyperlinear chromosomes should expand significantly with increases in problem epistasis.

Data Processing and Storage Systems for Use with Hyperlinear Chromosomes

Figure 12:
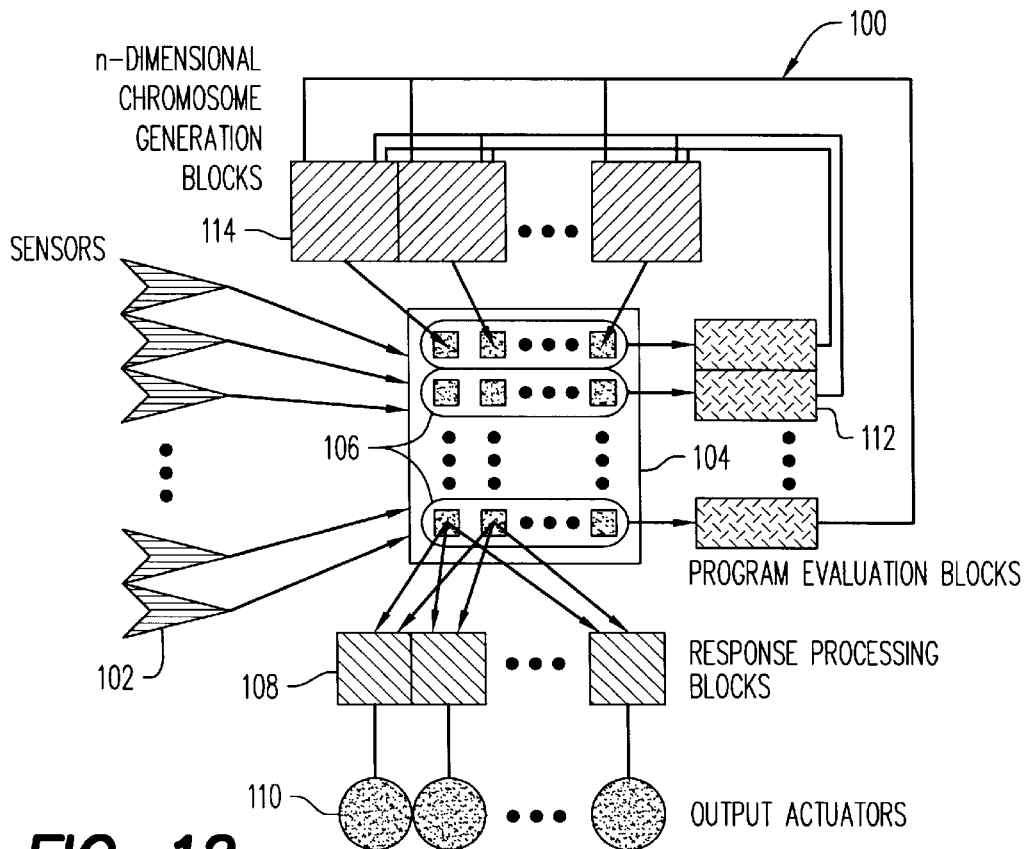
FIG. 12 is a schematic block diagram of a highly parallel data processing system employing n-dimensional chromosomes.

FIG. 12 is a schematic block diagram of a highly parallel data processing system 100 that adaptively analyzes and responds to large numbers of interrelated environmental factors without prejudice. This data processor is driven by a set of adaptive control programs which compete with each other for control of the machine's response during subsequent periods.

The system is composed of six main blocks:

(1) A sensor block consisting of a set of sensors 102 which sample environmental conditions during each response period.

(2) A memory block 104 containing a series of N control programs 106. Each control program consists of a multidimensional array of weights used to filter the environmental stimuli. In a preferred embodiment these weights may be three-dimensional chromosomes of the type previously described.

(3) A response processing block (or series of response processing blocks) 108 which is associated with a particular vector (a behavior vector) or series of vectors of parameters from the control program. Each response processing block 108 chooses an appropriate action in response to the environmental stimuli filtered by the best program of the previous period or a weighted average of the top N performing programs of the previous period.

(4) An output block consisting of an actuator (or set of output actuators) 110 which performs the action(s) chosen by the response processing blocks 108.

(5) A program evaluation block or blocks 112 which determines a numerical "fitness" for each control program based on how successful the machine would have been if that particular program had controlled the machine's response for this period.

(6) A program generation block or blocks 114 which create a new set of n-dimensional chromosomes each period from some combination, replication, or mutation of the existing set or population of chromosomes. This program generation is biased by the fitness calculations of the evaluation blocks 112 for each program in order to adaptitively improve the average program's performance.

While this system can be realized on a general purpose processor, the dedicated hardware implementation shown in FIG. 12 exploits one of the primary advantages of this system: that multiple behaviors can be simultaneously optimized and analyzed with a minimum of resource contention in a parallel processing system. Parallel implementation of conventional genetic algorithms has been described in the prior art literature. See Goldberg at p. 129.

Important advantages of the hyperlinear chromosome system of FIG. 12 are that it allows simultaneous optimization of multiple behaviors, and reduces the effective length of schema which may result in substantial increases in efficiency.

An important part of this embodiment is the memory mapping of the control program. This mapping allows stride based program recombination along vectors of related parameters and increases the parallelism of the system by reducing the overlap of processing units. Related parameters are mapped along a "behavior vector" within the control program. Additional behaviors can be mapped on intersecting vectors in order to share parameters which are common between separate behaviors. The mapping ensures that a particular behavior can be optimized without degrading the performance of other independent behaviors. More importantly, dependent behaviors can negotiate shared parameters to ensure the best overall response from the machine without prejudicially favoring one behavior over another intersecting behavior. For example if two behaviors depend on one shared parameter, the optimization of either behavior may be at the detriment of the opposing behavior. An optimal solution often depends on choosing an intermediate value that is the most beneficial.

Each control program is a multidimensional structure of fixed order and size. Program recombination utilizes many of the techniques of genetic algorithms, but is significantly more sophisticated due to the multiple dimensions of representation available to the control program and the exponentially larger variety of recombinations possible in an N-dimensional representation. Further, a hyperlinear data processor is much more powerful than any linear GA algorithm because it can cluster related control parameters without prejudice. Data processors which use traditional GA techniques, find it very hard to optimize schema with large defining length. As additional control parameters are added to the processing program, the linear nature of GA systems increases the defining length of schema encompassing outlying parameters of the control program. Because of the limitations of linear mapping, the defining length between any two related parameters may vary widely from the defining length of any other two parameters. This inconsistency provides an implicit prejudice in the search of the solution space.

An additional advantage of this mapping is that it permits highly sophisticated response evaluation by allowing a series of response blocks to independently evaluate vectors of filtered data for particular responses. This greatly enhances the parallelism of this machine since it reduces the conflict of multiple evaluators acting in concert. Even though a single parameter of the control program may be shared by multiple intersecting behavior vectors, each of these vectors can be analyzed separately to determine a particular facet of the machine's response.

This system utilizes a linear memory structure to map multi-dimensional relationships among a set of control parameters. This structuring allows a processor utilizing GA techniques to optimize highly non-linear relationships among vectors of controls without prejudicing the optimization of an opposing set of controls.

This system is very useful in controlling systems with many parameters that are linked by highly nonlinear relationships. One example of such a system would be a stock market model that could contain hundreds of dynamically changing parameters associated with a portfolio of stocks. Each of these parameters in turn, are inter-related with each other and with a series of market factors. Existing GA techniques lose efficiency with every increase in the number of parameters. Further these techniques have proved inadequate at optimizing competing relationships. For instance increasing expected profit while decreasing expected risk. A technique that maximizes expected profit tends to also maximize risk. An optimum solution would search for a point between the highest profit strategy and the lowest risk strategy that meets a particular (or even a dynamically changing) set of criteria.

Another example would be controlling the flow of water between an interconnected series of pipes, valves, drains, and wells. Changing the setting of any particular valve may have significant effects on many other parts of the network. Dynamically optimizing valve settings in response to a constantly changing set of flow and pressure meters along the network is an extremely complicated process. For this reason, most systems simply choose a conservative static solution with little flexibility. A hyperlinear data processor could use the readings from a series of pressure and flow meters to adaptively derive the best settings for all valves. More importantly, these settings could dynamically change in response to the needs of the system. The setting for any particular valve depends on a vector (or series of vectors) of other valve settings, system parameters, and sensor readings. Additionally, separate processing elements could simultaneously optimize different valve setting with the minimal amount of contention for shared resources.

By vectorizing these relationships, hyperlinear mappings enable GA techniques to simultaneously optimize competing trends. Hyperlinear structures also present significant potential in multiobjective optimizations. Hyperlinear structures allow one gene to be linked to multiple independent equations without duplication. This organization can provide simultaneous optimization across multiple criteria without bias to nondominated individuals.

Computer Readable Memories

Figure 13:
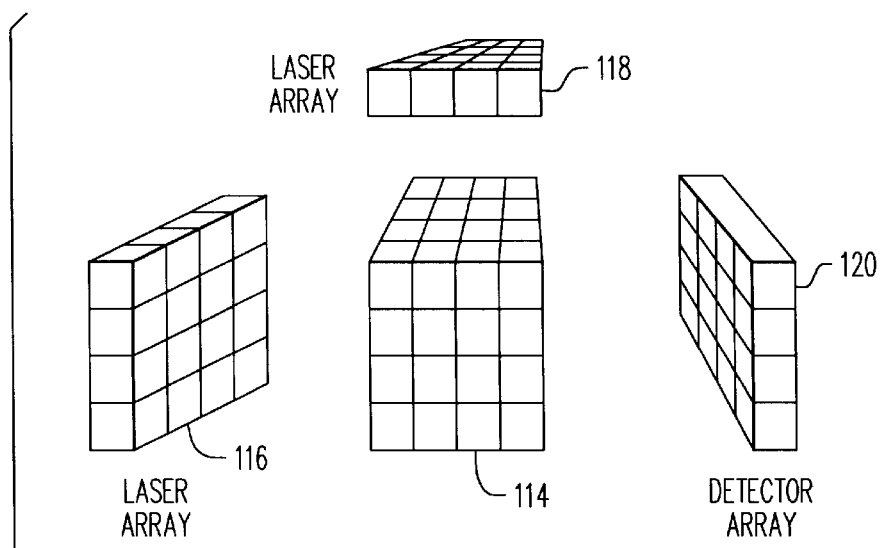
FIG. 13 is a schematic diagram of a three-dimensional, computer readable memory.

Three-dimensional chromosomes may be effectively stored in three-dimensional computer readable memories. An example of such a memory is shown in FIG. 13. Data defining one or more chromosomes may be stored in an optically active, transparent cube 114. Data may be written into the cube by laser arrays 116 and 118. When reading data, the laser arrays are again directed on the cube, and the data read by a detector array 120 placed directly opposite of the laser array 116. Such a system and its operation are described by Birge in *"Protein-Biased Computers", Scientific American* (March 1995). In such a system the memory structure may correspond geometrically with the arrangement of genes in the chromosome.

Hyperloop Chromosomes

Hyperloop chromosomes are an extension of hyperlinear chromosomes. Hyperloop chromosomes treat genes on the extremities of a dimension to be adjacent. This forms a multidimensional toroidal structure that can increase the linkage among related elements of a hyperlinear structure. Subsequent genes along a vector in a hyperloop chromosome are accessed by a stride or a wraparound stride. Strides provide an offset to the address of the next gene on a hyperlinear dimensional vector. Wraparound strides are an offset used to access the initial gene on a hyperlinear dimensional vector after passing the final gene on the hyperlinear dimensional vector (connecting first and last genes into adjacent positions on a hyperloop).

It is known in the art to treat a linear chromosome as a loop, by considering the ends of the chromosome to be attached. Goldberg p. 119. This is illustrated in FIG. 14, where a linear chromosome 200 is represented as a loop 202, to indicate that genes 0 and 2 are treated as adjacent to one another. Looping of linear chromosomes has been a conventional optimization for GA because it increases the linkage among the extreme elements of the chromosome. However, the expansion of this representation to multidimensional structures is significantly more powerful.

A hyperloop structure allows all genes to be considered mapped within a continuous multidimensional surfaces (a multidimensional toroid). This guarantees that all genes can maximize the number of adjacent genes and correspondingly maximize their linkage to these adjacent genes. FIG. 15 illustrates the linkages among the genes of a planar chromosome when the opposing edges of the structure are connected to form a hyperloop toroid. In a standard hyperlinear structure, gene 0 would only be considered adjacent to genes 1 and 3. Similarly gene 1 would only be considered adjacent to genes 2, 4 and 0. Only gene 4 would have four adjacent neighbors (1, 5, 7 and 3). However, in a hyperloop toroid, all genes have four adjacent neighbors. Thus, gene 0, for example, is treated as adjacent to genes 6, 1, 3 and 2.

Hyperlinear structures of higher dimensionality can also be represented (if not easily illustrated) as hyperloop structures of higher dimensionality. The best way to visualize the connections in these higher level dimensional structures is to consider traveling along a vector through some particular set of dimensions. Upon passing an endpoint of a sequence of genes, the toroidal mapping of the chromosome allows travel to continue at the beginning of the sequence of genes. For example in FIG. 14, when traveling along the vector passing from gene 0 to gene 1 to gene 2, continuing past gene 2 returns the vector to gene 0.

FIG. 16 demonstrates the mapping of a multidimensional torroidal surface onto a row major memory. However, the surface could just as easily be mapped into other memory arrangements in order to facilitate processing for a particular system.

Stride along any dimension N is the product of the depths of all lower dimensions. For example, stride for dimension Z in FIG. 16 is the depth of X times the depth of Y=4*5=20. Torroidal wrapping logically connects the extremities of a behavior vector. For example, in FIG. 16 cell 16 and cell 19 are adjacent along the X direction, cell 3 and cell 19 are adjacent along the Y direction, and cell 19 and cell 59 are adjacent along the Z direction. Stride calculations simply use a modulus operator to wrap back around to the first element after traveling past the last element of a behavior vector.

While the invention has been illustrated with reference to particular embodiments, it is not limited to these embodiments, but rather includes the subject matter within the spirit and scope of the following claims.

I claim:

1. An adaptive computing system for receiving input information and producing an optimized control signal based on a sequence of simultaneous equations sharing at least some parameters comprising:

a computer readable, population memory for storing groups of parameters, each group corresponding to a member of the population;

means for storing parameters for a member of the population in the population memory at an n dimensional address where n is $\geq 2$, and wherein parameters of each individual equation of that member are arranged in sequentially addressed memory locations to form low-order schemata relevant to the computation and wherein a parameter common to two or more equations is located at a single memory location which lies at an intersection of the sequentially addressed memory locations constituting the equations which share the parameter;

means for retrieving parameters corresponding to each individual equation from the sequentially addressed memory locations;

a random number generator;

means responsive to the random number generator for dividing into at least two portions, the n dimensional array of addresses defining each of at least two members of the population and for combining the divided portions of the at least two members of the population to form a new population member;

means for evaluating, on the basis of the input information, the equations defined by the parameters stored for a member of the population to determine the fitness of the member of the population;

means for reproducing population members at least partially in response to the evaluated fitness of the member; and control means for repetitively retrieving, combining, reproducing, evaluating and storing said population members and for producing an optimized control signal on the attainment of a predetermined level of fitness of one or more members based on the input information, wherein said means for dividing and for combining comprises:

means for randomly selecting one of the n dimensions;

means for dividing the chromosome into parallel substrings lying along the selected dimension;

means for selecting one of said substrings of the chromosome;

means for randomly selecting a crossover point in the selected substring;

means for dividing the chromosome at the selected crossover point; and means for creating at least one new chromosome by combining portions of two divided chromosomes.

2. A machine comprising:

a memory which contains data representing a population of hyperlinear program chromosomes in which each hyperlinear program chromosome represents the mapping of physical problem parameters onto program genes which are addressed in memory as multiple, intersecting vectors in n dimensions, where n is $\geq 2$; and a processor for selecting, evaluating and creating the population of hyperlinear program chromosomes, the processor comprising:

means for iteratively creating new hyperlinear chromosomes by performing hyperlinear crossover of members of the hyperlinear program chromosome population;

means for evaluating the fitness of the chromosomes to solve the physical problem; and means for selecting hyperlinear chromosomes for the next generation on the basis of the evaluated fitness of the chromosomes to solve the problem, wherein said means for iteratively creating new hyperlinear chromosomes comprises:

means for randomly selecting one of the n dimensions;

means for dividing the chromosome into parallel substrings lying along the selected dimension;

means for selecting one of said substrings of the chromosome;

means for randomly selecting a crossover point in the selected substring;

means for dividing the chromosome at the selected crossover point; and means for creating at least one new chromosome by combining portions of two divided chromosomes.

3. The machine of claim 2, wherein n is equal to 3.

4. The machine of claim 3, wherein the memory is a three-dimensional optical memory in which the data representing each hyperlinear program chromosome is stored in a physical location corresponding to the three-dimensional arrangement of the multiple intersecting vectors.

5. The machine of claim 4, wherein the program genes of the hyperlinear program chromosomes have the same bit length.

6. The machine of claim 2, wherein the physical problem is represented by a sequence of simultaneous equations and wherein the vectors are arranged to form low-order schemata relevant to the computation.

7. The machine of claim 2, wherein genes on the extremities of a dimension are addressed as being adjacent to one another.

8. The machine of claim 2, wherein said means for iteratively creating new hyperlinear chromosomes performs hyperlinear crossover based on a random selection of one of the n dimensions of the hyperlinear program chromosome.

9. A machine for providing control output signals to a system responsive to sensed, environmental conditions of the system wherein the system is modeled by a plurality of simultaneous equations which equations share at least some parameters comprising:

memory for storing hyperlinear chromosome populations into which the terms of each of the simultaneous equations are mapped as sequential genes, the hyperlinear chromosomes being n dimensional where n $\geq 2$;

parallel processing means for simultaneously evaluating the fitness of members of the hyperlinear chromosome population;

means for repetitively generating new hyperlinear chromosomes responsive to the evaluated fitness of the chromosome including means for effecting hyperlinear crossover to produce members of a succeeding generation of hyperlinear chromosomes;

means for selecting one or more of the hyperlinear chromosomes to generate output control signals responsive to current sensed parameters of the system;

wherein said means for effecting hyperlinear crossover comprises:

means for randomly selecting one of the n dimensions;

means for dividing the chromosome into parallel substrings lying along the selected dimension;

means for selecting one of said substrings of the chromosome;

means for randomly selecting a crossover point in the selected substring;

means for dividing the chromosome at the selected crossover point; and means for creating at least one new chromosome by combining portions of two divided chromosomes.

10. The machine of claim 9, wherein said means for effecting hyperlinear crossover performs hyperlinear crossover based on a random selection of one of the n dimensions of the hyperlinear program chromosome.

11. A process for problem solving residing in a computer system comprising providing a computer readable memory for storing initial and subsequent hyperlinear chromosome populations, the hyperlinear chromosomes being n dimensional where n ≧2, and at least one processor for selecting, evaluating and creating hyperlinear chromosome populations and further comprising iterations of a series of steps, each iteration including the steps of creating new hyperlinear chromosomes including the step of performing hyperlinear crossover of members of the hyperlinear chromosome population;

evaluating the fitness of hyperlinear chromosomes to solve the problem; and selecting hyperlinear chromosomes for the next generation on the basis of the evaluated fitness of the chromosomes to solve the problem, wherein the step of performing hyperlinear crossover comprises the steps of:

randomly selecting one of the n dimensions;

dividing the chromosome into parallel substrings lying along the selected dimension;

selecting one of said substrings of the chromosome;

randomly selecting a crossover point in the selected substring;

dividing the chromosome at the selected crossover point; and creating at least tone new chromosome by combining portions of two divided chromosomes.

12. The process of claim 11, wherein the hyperlinear chromosomes are three-dimensional.

13. The process of claim 12, wherein the step of performing hyperlinear crossover includes the steps of randomly selecting one of the three dimensions;

dividing the chromosome into parallel substrings lying along the selected dimension;

selecting one of said substrings of the chromosome;

randomly selecting a crossover point in the selected substring;

dividing the chromosome at the selected crossover point; and creating at least one new chromosome by combining portions of two divided chromosomes.

14. The process of claim 13, wherein the crossover point is selected to coincide with a gene boundary.

15. The process of claim 13, wherein the crossover point is selected to lie within a bit string corresponding to a single gene.

16. The process of claim 11, wherein the hyperlinear chromosomes are comprised of genes of equal bit length and wherein the genes are arranged within the memory as cubes within a rectangular-solid-shaped volume which contains the chromosome.

17. The process of claim 16, wherein the hyperlinear crossover is effected by cleaving rectangular-solid-shaped chromosomes into three-dimensional portions, and recombining portions of the chromosomes to produce a new chromosome having the same dimensions as the parent chromosomes.

18. The process of claim 11, wherein the hyperlinear crossover is selected to occur at the boundary of genes which effect the evaluation of fitness of the chromosome.

19. The process of claim 11, wherein the hyperlinear crossover is selected to occur within a bit string corresponding to genes which effect the evaluation of fitness of the chromosome.

20. The process of claim 11, wherein the hyperlinear crossover is performed based on a random selection of one of the n dimensions of the hyperlinear program chromosome.

\* \* \* \* \*